(No Model.) 2 Sheets—Sheet 1.

D. W. STINSON.
VEHICLE LIGHT AND GOVERNOR FOR SAME.

No. 579,190. Patented Mar. 23, 1897.

WITNESSES:
William P. Gaeber
C. R. Ingerson

INVENTOR
D. W. Stinson
BY Munn & Co
ATTORNEYS.

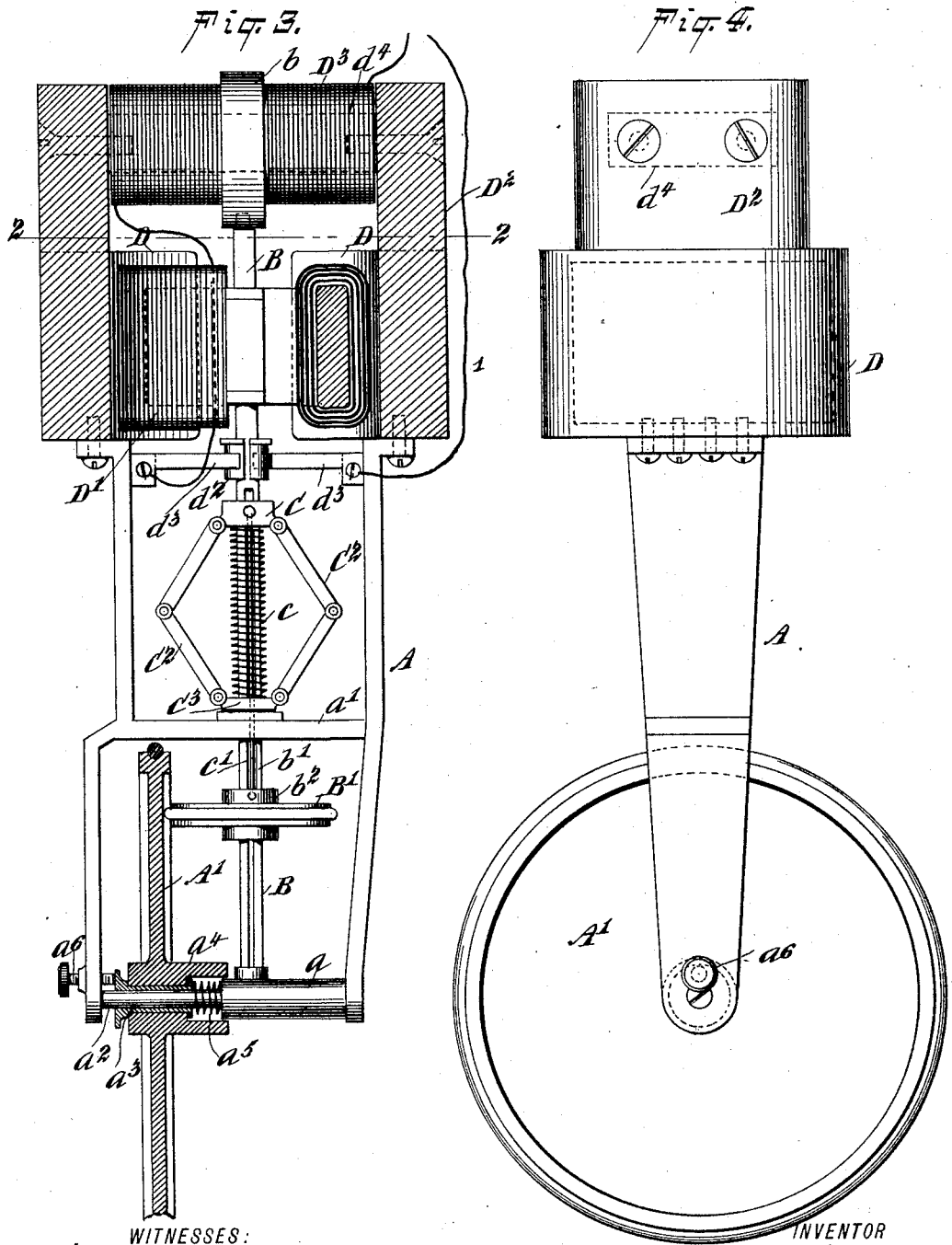

UNITED STATES PATENT OFFICE.

DAVID W. STINSON, OF ST. LOUIS, MISSOURI, ASSIGNOR TO GUSTAVOS HEIDEL, OF SAME PLACE.

VEHICLE-LIGHT AND GOVERNOR FOR SAME.

SPECIFICATION forming part of Letters Patent No. 579,190, dated March 23, 1897.

Application filed November 23, 1895. Serial No. 569,953. (No model.)

*To all whom it may concern:*

Be it known that I, DAVID W. STINSON, of St. Louis, in the State of Missouri, have invented new and useful Improvements in Vehicle-Lights and Governors for the Same, of which the following is a full, clear, and exact description.

This invention relates to lights for vehicles, such, for instance, as bicycles, tricycles, &c.; and the object is to provide a strong and efficient electric light, the electricity for the same being generated by the action of the vehicle-wheel, and, further, to provide a governor which will operate to maintain a steady and uniform power for the lamp.

I will describe a device embodying my invention, and then point out the novel features in the appended claims.

Reference is to be had to the accompanying drawings, forming a part of this specification, in which similar characters of reference indicate corresponding parts in all the views.

Figure 1:
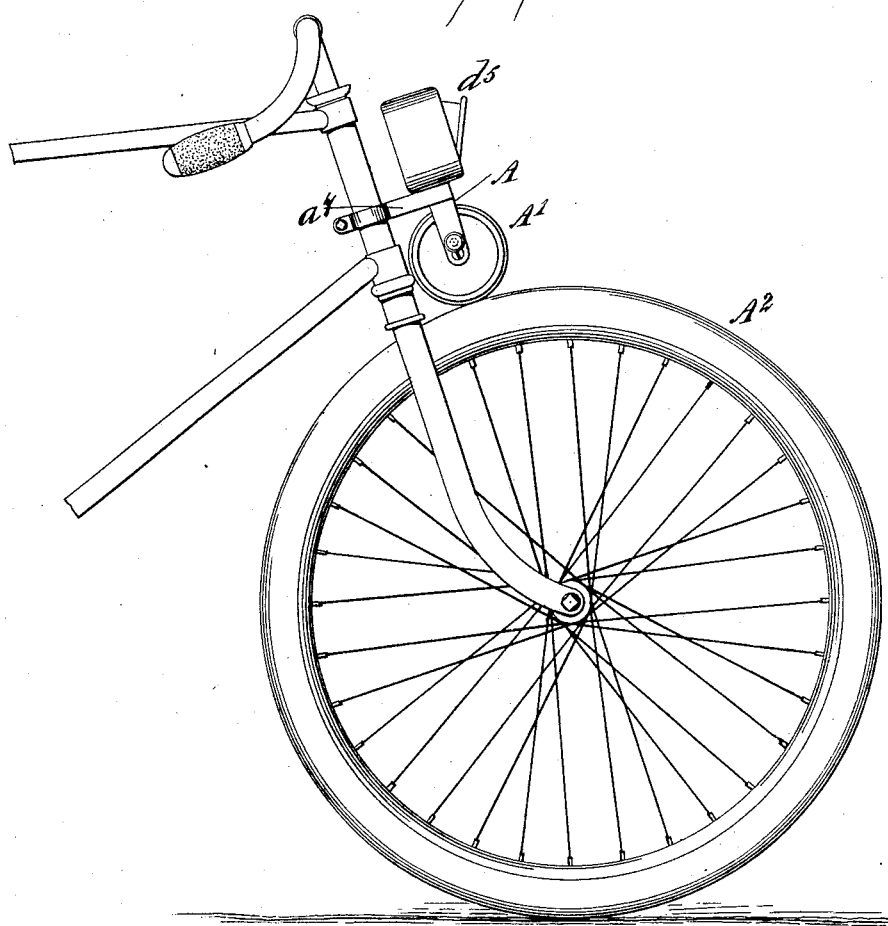
Figure 2:
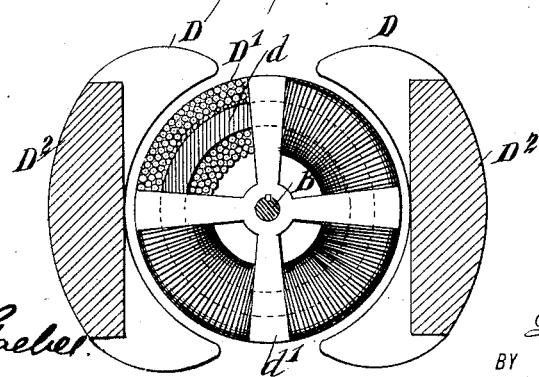

Figure 1 is a side elevation showing a portion of a bicycle and having a device embodying my invention secured thereon. Fig. 2 is a partial plan and partial section of the armature and field-magnets employed in my invention, the section being taken on the line 2 2 of Fig. 3. Fig. 3 is a front elevation of the electric generator and means for governing the same, and Fig. 4 is a side elevation thereof.

Referring to the drawings, A designates the frame, comprising a lower end bar $a$, an intermediate cross-bar $a'$, and a journal portion $a^2$, extended from one end of the bar $a$ to one side of the frame, as plainly indicated in Fig. 3. On the journal $a^2$ is mounted a sleeve $a^3$, and upon this sleeve $a^3$ the hub $a^4$ of a driving-wheel A' is revolubly mounted. This wheel A' is adapted to engage its periphery with the periphery of a vehicle-wheel $A^2$, and, if desired, the wheel A' may be peripherally grooved to receive a rubber tire.

B is a vertical shaft having a step-bearing in the bar $a$ and extended through the cross-bar $a'$ and having an upper bearing in a ring $b$ at the upper end of the generator or dynamo and centrally located on the core, to be hereinafter described. On this shaft B is a friction-disk B', engaging with its periphery against the side of the power-wheel A'. This disk B' is designed to rotate with the shaft and to have a movement longitudinally of the shaft, as will be hereinafter explained.

Above the cross-bar $a'$ is a governor designed to raise and lower the disk B' with relation to the axis of the wheel A' in accordance with the speed of the vehicle. This governor comprises a ring C, adapted to rotate with the shaft B, having a connection with the shaft whereby the ring may move longitudinally of said shaft. To the said ring C one end of toggle-links $C^2$ are pivoted, the other or lower ends of said links being pivoted to a ring $C^3$, rigidly secured to the shaft B, and between the rings C $C^3$ a spring $c$ is coiled around the shaft B. A connection, such as a wire or rod $c'$, extends from the hub $b^2$ of the disk B' to a connection with the ring C, whereby the disk B' will be raised and lowered in unison with the raising and lowering of the ring C, due to the centrifugal action of the toggle-links $C^2$. This wire or rod $c^2$ is seated in the groove $b'$, and consequently will serve as a feather connection between the shaft and parts C B' to hold them in rotary connection with the shaft.

In the top of the frame A are mounted the segmental field-pieces D, within which the armature D', mounted on the shaft B, rotates. This armature D' comprises a tubular core $d$, having insulated wires suitably wound thereon. The armature-core $d$ is supported by radial arms $d'$, extended from the hub, rigidly mounted on the shaft B. The armature comprises four coils connected one with another and each is connected by a lead-wire with one segment of a commutator $d^2$ on the shaft B, with which brushes $d^3$, extended from the frame A, engage.

The field-pieces have upwardly-extended portions $D^2$, supporting a core $d^4$, carrying the before-described centrally-located ring-band, upon which core is wound a wire $D^3$, the said wire $D^3$ being in connection at one end with the binding-screw of one of the brushes $d^3$, the other end being connected to a lamp in a hood $d^5$ on the generator, and from the binding-screw of the other brush a wire $l$ leads to the lamp.

The wheel A' is adapted to rotate freely on the sleeve $a^3$, but to be moved out of engagement with the friction-disk B' when it is desired to stop the operation of the generator. As here shown, the sleeve $a^3$ is flanged outward at its outer end, and the opposite end of the hub $a^4$ is countersunk, and between the inner end of the hub $a^4$, within its countersunk portion, and a shoulder or stop on the journal portion $a^2$ is arranged a spring $a^5$. A thumb-screw $a^6$, having a bearing through a tapped hole in one of the side frames A, is adapted to bear against the outer side of the flange on the sleeve $a^3$ to force the wheel A′ toward and against the rubber-bound periphery of the disk B′, and obviously when said thumb-screw is slacked off the spring $a^5$ will move the wheel A′ out of engagement with the disk B′.

As indicated in Fig. 1, the lamp and generator may be inclosed in a suitable casing, and the whole may be removably attached to the steering-fork of a bicycle by means of an arm or arms $a^7$.

It will be seen that as the motion of the wheel A′ is increased by the increased motion of the wheel of the vehicle with which it engages the toggle-links $C^2$ of the governor will be forced outward by centrifugal action, thus drawing the ring C downward on the shaft B, and consequently forcing the disk B′ toward the axis of the wheel A′, and as the speed of the wheel A′ diminishes of course the parts will move in the opposite direction, and with my governor an electric light generated by the action of the vehicle carrying the same will be maintained at a substantially uniform power, thus preventing flickering and insuring a steady light.

Having thus described my invention, I claim as new and desire to secure by Letters Patent—

1. The combination with a frame, of an electrical generator, a revoluble shaft mounted in the frame, the shaft having a groove, a collar fixed to the shaft, a second collar movable on the shaft, toggle-links connecting the two collars, a spring embracing the shaft and pressing the collars, a rod connected to the movable collar and passed through the groove in the shaft, a friction-disk movable on the shaft and held from independent rotation by means of the rod, and a drive-wheel adapted to engage the friction-disk, substantially as described.

2. The combination of a revolubly-mounted shaft having a longitudinal groove, a collar fixed to the shaft, a second collar slidable on the shaft, a rod slidable in the groove of the shaft and connected to the slidable collar, a wheel slidable on the shaft, and connected to the rod, and means for connecting the fixed and sliding collar, such means being capable of moving the sliding collar under the influence of centrifugal force, substantially as described.

DAVID W. STINSON.

Witnesses:
HUGH M. THOMPSON,
J. M. PERRY.